Aug. 14, 1945.

R. C. INGERSOLL 2,382,485

METHOD OF FORMING CONICAL DISKS

Filed Nov. 3, 1941

Inventor:
Roy C. Ingersoll
By: Edward C. Gritzbaugh
Atty.

Aug. 14, 1945.　　　R. C. INGERSOLL　　　2,382,485
METHOD OF FORMING CONICAL DISKS
Filed Nov. 3, 1941　　　3 Sheets-Sheet 2
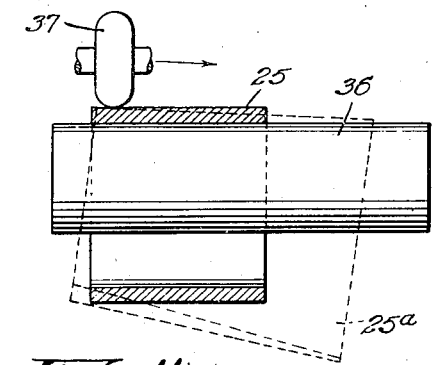
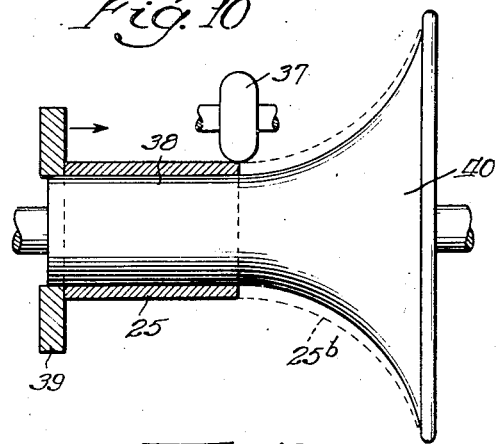
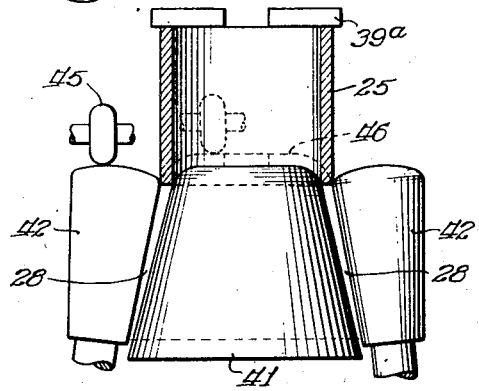
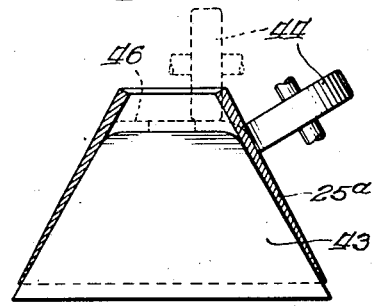
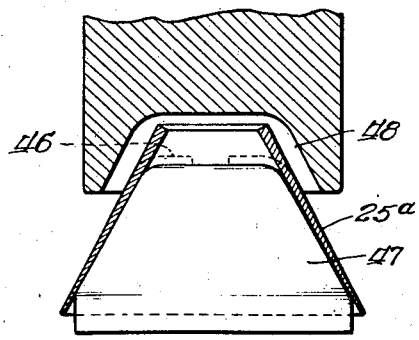
Inventor:
Roy C. Ingersoll
By: Edward C. Gritzbaugh
Atty.

Aug. 14, 1945.   R. C. INGERSOLL   2,382,485
METHOD OF FORMING CONICAL DISKS
Filed Nov. 3, 1941   3 Sheets-Sheet 3

Inventor:
Roy C. Ingersoll
By: Edward C. Gritzbaugh
Atty.

Patented Aug. 14, 1945

2,382,485

UNITED STATES PATENT OFFICE 2,382,485

METHOD OF FORMING CONICAL DISKS

Roy C. Ingersoll, Winnetka, Ill., assignor to Borg-Warner Corporation, Chicago, Ill., a corporation of Illinois Application November 3, 1941, Serial No. 417,599

8 Claims. (Cl. 29—159.01)

This invention relates to the manufacture of conical disks suitable for heavy load purposes such as in the construction of wheels for tractors and other vehicles. Such a disk includes a conical body portion and a central "hat" portion for attachment to a hub. In order to combine maximum strength with economy of material, it is desirably tapered in thickness from center to periphery. The primary object of the invention is to provide a method of constructing such a disk from flat sheet stock with a minimum wastage of material.

Other objects, the advantages and uses of the invention will become more apparent after reading the following specification and claims, and after consideration of the drawings forming a part of the specification, wherein:

Fig. 9 is a view illustrating the forming of a conical disk according to another modified form of the method comprising the invention;

Fig. 10 is a view illustrating the forming of a conical disk according to a further modification of the method comprising the invention;

Fig. 11 is a view illustrating the forming of a conical disk according to a still further modification of the method comprising the invention;

Fig. 12 is a view illustrating the step of forming the hub or "hat" portion of a conical disk formed by any of the methods illustrated in Figs. 1 to 10 inclusive;

Fig. 13 is a view illustrating a somewhat modified form of the step of forming the hub or "hat" portion of the disk;

In general, the method comprising the invention includes the steps of forming a blank of uniform thickness material, such as heavy sheet steel, curling the blank into either cylindrical or conical form, rolling or spinning the blank or the cylinder formed from the blank, so as to reduce the thickness of one side of the wall thereof, and to simultaneously give the blank a shape which results in conical formation in the completed disk, and subsequently forming the hat portion of the disk. In the forms of the invention shown in Figs. 1 to 10 inclusive, a rectangular blank is rolled into cylindrical form and its ends welded together to form a cylinder. This cylinder is then rolled or spun so as to reduce the thickness of one end region thereof and to simultaneously change the cylinder to conical shape owing to the circumferential elongation produced by the reduction in thickness. In the form of the invention shown in Figs. 14 to 19 inclusive, these steps are reversed, the spinning and circumferential elongation being performed upon the blank while it remains flat, and the curling into conical form and welding of the ends being performed subsequently. In either case, the hat portion is formed subsequently to the forming of the cone and the tapering of the wall thereof.

Figure 1:
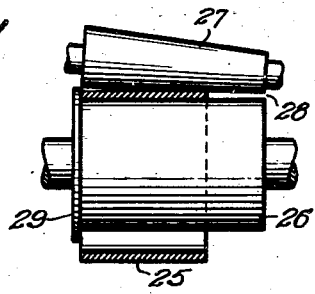
Fig. 1 is a view illustrating a step in the forming of a conical disk according to one form of the method comprising the invention.
Figure 2:
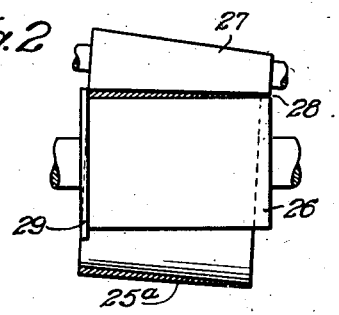
Fig. 2 is a view illustrating a subsequent step in the form of the method illustrated in Fig. 1.

Referring now to Figs. 1 and 2, the numeral 25 indicates the cylinder which has been formed by rolling a rectangular blank to bring its ends into abutting relationship, and welding said ends. A cylinder thus formed is inserted between reducing rolls 26 and 27, arranged so as to form between them a tapering gap 28, and is rolled between the rolls 26 and 27 while the width of the gap 28 is progressively decreased. As a result, the end of the cylinder which is acted upon by the narrower region of the gap 28, will be gradually reduced in thickness and extended in area, thereby causing the cylinder 25 to assume the shape of a truncated cone as indicated at 25a in Fig. 2. The rolls 26 and 27 may be conical and cylindrical respectively, as shown.

The reduction of a cylinder in this manner involves the rather difficult problem of constraining the cylinder to the desired position between the rolls, and preventing its creeping out of the gap 28. The invention meets this problem by providing on the end of one of the rolls 26 or 27, a shoulder 29 against which one end of the cylinder 25 abuts. The shoulder 29 is located adjacent the larger end of the gap 28 so that the tendency of the cylinder to creep toward said larger end will be restrained.

Decreasing the width of the gap 28 may be accomplished by moving the roll 27 toward the roll 26 or vice versa.

Figure 3:
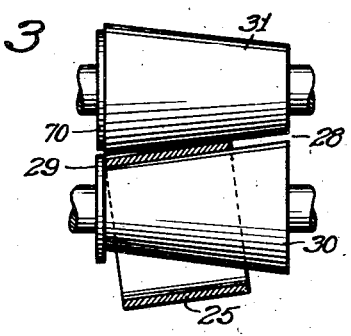
Fig. 3 is a view illustrating a step in the forming of a conical disk according to a somewhat modified form of the method of the invention.
Figure 4:
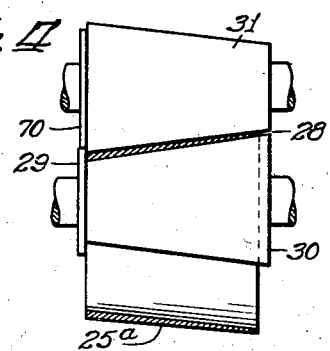
Fig. 4 is a view illustrating a subsequent step in the form of the method shown in Fig. 3.

The method illustrated in Fig. 3 is substantially identical to that shown in Figs. 1 and 2 with the exception that the rolling is accomplished by two conical rolls 30 and 31 instead of the conical and cylindrical rolls 26 and 27, shown in Fig. 1. Thus, the axes of the two rolls may be maintained parallel to each other.

An important aspect of this form of the invention is the employment of an arrangement wherein the shoulder 29 is formed at the small end of the roll 30, so that the cylinder 25 contacts the shoulder 29 at only one point, and the discontinuing of the rolling operation when the cone 25a has received sufficient flare to bring the butt end thereof into the plane of the shoulder 29. This avoids the setting up of undesirable interference between the shoulder 29 and the butt end of the cone during the rolling operation.

The form of the invention shown in Fig. 3 further provides for accurately gauging the thickness of the cone 25a at the completion of the rolling operation, by the contact of a shoulder 70, formed on the roll 31, with the edge of the flange 29.

Figure 5:
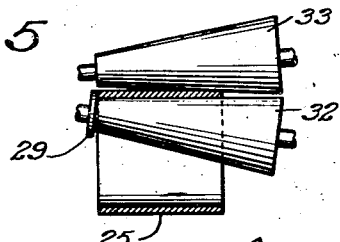
Fig. 5 is a view illustrating the forming of a conical disk according to a further modified form of the method of the invention.
Figure 6:
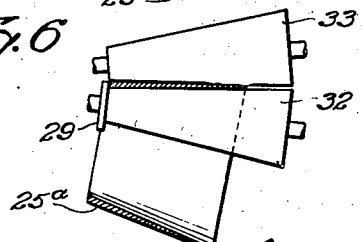
Fig. 6 is a view illustrating a subsequent step in the form of the method shown in Fig. 5.
Figure 7:
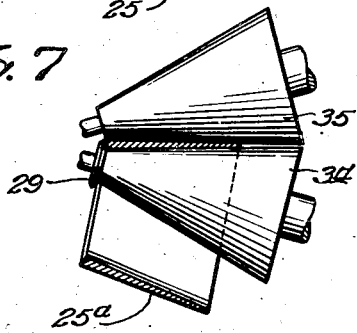
Fig. 7 is a view illustrating a subsequent step in the form of the method shown in Fig. 5.
Figure 8:
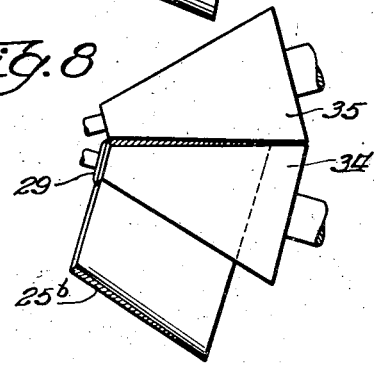
Fig. 8 is a view illustrating a subsequent step in the form of the method shown in Fig. 5.
Figure 14:
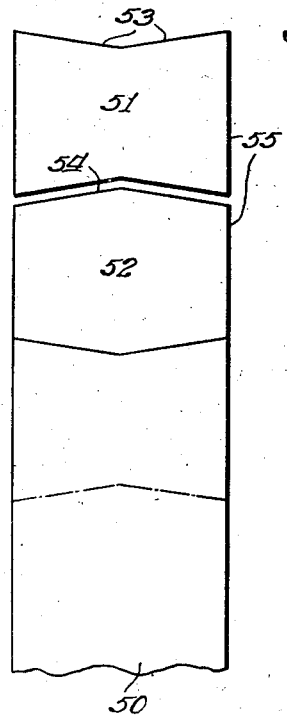
Fig. 14 is a view illustrating one step in another modification of the method comprising the invention.
Figure 15:
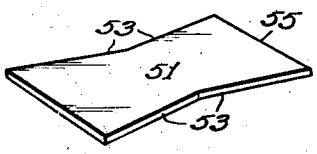
Fig. 15 is a perspective view of a blank formed by the step shown in Fig. 14.
Figure 20:
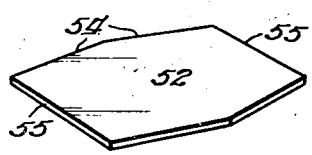
Fig. 20 is a perspective view of another blank formed in the step shown in Fig. 14.
Figure 16:
Fig. 16 is a view showing a subsequent step of processing the blank shown in Fig. 15.
Figure 21:
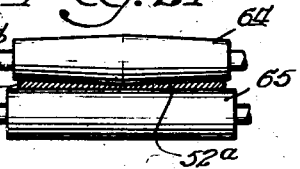
Fig. 21 is a view illustrating a subsequent step of processing the blank shown in Fig. 20.

The modification of the method shown in Fig. 5 is substantially identical to that shown in the previous figure, but provides the additional feature of equalizing the circumferential speed of corresponding points on the respective rolls 32 and 33. This is accomplished by arranging the two conical rollers with their larger ends opposed to each other. This form of the invention also provides for a faster rate of rotation of those regions of the rolls which do the most reducing. This facilitates the formation of the cones for the reason that it tends to circumferentially stretch the wall at that end of the cylinder which is to be thinned and enlarged.

This form of the invention retains the advantage of having the shoulder 29 formed at the small end of the roll 32.

This form of the invention also contemplates the further flaring of the cone 25a by removing it from the rolls 32 and 33 and subjecting it to a second rolling operation between rolls 34 and 35 of increased conical taper. Between the rolls 34 and 35 the intermediate cone 25a may be enlarged to a cone 25b of greater flare, while maintaining the butt end of the cone at one side of the plane of the shoulder 29.

In the form of the invention shown in Fig. 9, the cylinder 25 is placed upon a mandrel 36, and is acted upon by a spinning roller 37 which moves in a path that converges with reference to the axis of the mandrel 36, thereby progressively thinning the wall of the cylinder 25 toward one end, and producing the cone 25a as indicated in dotted lines.

In the form of the invention shown in Fig. 10, the cylinder 25 is forced axially onto a mandrel 38 by means of a pressure ring 39, and beneath a spinning roller 37. As the cylinder 25 is forced onto the flaring end region 40 of the mandrel 38, it assumes the conical or belled form shown in broken lines at 25b.

In the form of the invention shown in Fig. 11, the cylinder 25 is forced by means of a pushing device 39a, between a roller 41 and a plurality of rollers 42 forming between them a series of tapering gaps 28. As the cylinder 25 is advanced, it assumes a conical shape, its wall tapered in cross-section to correspond to the shape defined between the gaps 28.

The forming of the "hat" portion of the disk may be accomplished by placing the cone 25a on a mandrel 43 and spinning the butt end thereof inwardly against the apex of the mandrel by means of a spinning wheel 45 as shown in Fig. 11. If desired, the spinning wheel may be incorporated in the same apparatus that imparts the conical shape, as shown in Fig. 12. The "hat" portion is indicated by the reference numeral 46 in Figs. 11 and 12.

An alternative method of forming the "hat" portion is to place the cone 25a on a die element 47 and form the butt portion thereof inwardly by means of a forming die 48, moved under pressure in a suitable press or equivalent device.

Subsequently to the forming operation disclosed in Figs. 11, 12 and 13, suitable operations of perforating the "hat" portion and forming the periphery for attachment to the wheel rim may be performed.

In the form of the invention shown in Figs. 14 to 23 inclusive, a strip 50 of sheet stock is severed in a blanking die to form alternating intermediate blanks 51 and 52. The blank 51, shown in Fig. 15, has ends 53 that form with each other an obtuse angle less than 180 degrees. The blank 52, shown in Fig. 20, has ends 54 that form with each other an obtuse angle of greater than 180 degrees. The side edges 55 of the respective blanks are formed by the side edges of the stock 50.

Figure 17:
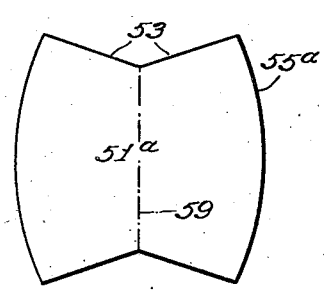
Fig. 17 is a plan view of the blank subsequent to the processing step shown in Fig. 16.

The blanks 51 are subjected to an elongating and reducing operation between a pair of rolls 57 and 58, the former being of double conical form with its extremities of greater diameter than its middle. The blank 51a resulting from this operation is shown in Fig. 17. Its side regions 55a are reduced in thickness and extended in length as shown. Because of the extension in area they tend to assume an arcuate shape as shown.

Figure 18:
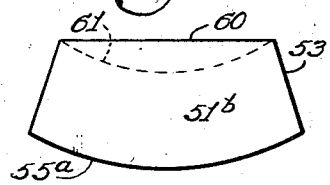
Fig. 18 is a plan view of a blank formed by splitting the blank shown in Fig. 17.
Figure 23:
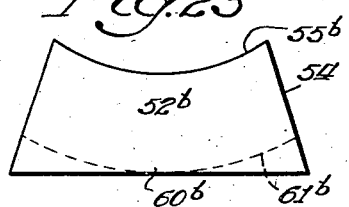
Fig. 23 is a view of a blank formed by splitting the blank shown in Fig. 22.

The intermediate blank 51a is then split along the line 59 to form a pair of final blanks 51b of roughly trapezoidal form, as shown in Fig. 18, each having an elongated, reduced thickness side 55a, and a shorter thicker side 60 which may, if desired, be trimmed to arcuate shape as indicated by the broken line 61.

Figure 19:
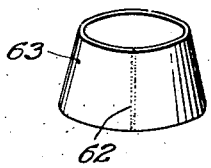
Fig. 19 is a perspective view of a conical disk formed from the blank shown in Fig. 18, in an intermediate stage of final completion.

The blank 51b is rolled into the form of a cone 63 and its ends 53 are welded together as indicated at 62 in Fig. 19.

The blanks 52 are subjected to a rolling operation between a pair of rollers 64 and 65, the former being in the shape of a double cone with reduced ends and enlarged middle. The resulting blank 52a has a reduced central region and thicker side regions 55b. The extension of area occurring in the middle region of the blank 52a tends to give the side regions 55b a concave arcuate shape as shown.

The intermediate blank 52a is split down the middle as at 59 to form two final blanks 52b, each having a side region 55b of maximum thickness and minimum length and side regions 60b of reduced thickness and maximum length. The side regions 60b may, if desired, be trimmed as at 61b to an arcuate shape suitable for the proper forming of the edge of a cone. The blank 52b is then rolled into conical shape and its ends 54 are welded to form a cone similar to the cone 63 of Fig. 19.

The cone 63 resulting from either of the blanks 51 or 52 is subject to a "hat" forming operation similar to one of those shown in Figs. 11, 12 and 13.

Figure 22:
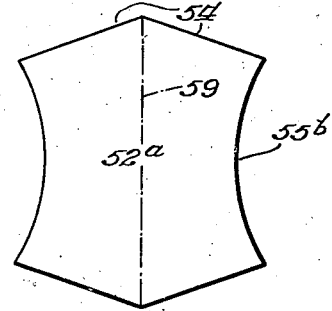
Fig. 22 is a view of the blank as processed by the step shown in Fig. 21.

Instead of forming the blanks 51 and 52 with obtuse angled ends as shown, they may be rectangular, and the reducing operation relied upon to spread their side or middle regions to produce intermediate blanks of either shape shown in Figs. 17 and 22 respectively.

An important feature of the methods described above, and particularly inherent in those methods disclosed wherein the metal is rolled and spun, is that the material of the weld is worked to refine the grain structure and renders this part of the wheel indistinguishable from the remainder of the wheel.

The method of my invention has the advantage of forming a conical disk with an absolute minimum of scrap loss. Furthermore, as a result of the tapered cross-section, the total weight of the disk may be maintained at a minimum, and yet the strength of the disk will be equivalent to that of any disk having the same thickness in the hub region.

I claim:

1. The steps in the method of forming, suitable for use in the construction of vehicle wheels and the like, a disk having a conical wall portion and a central substantially co-planar hat portion for attachment to a hub or the like, comprising: curling a strip of flat stock to bring its ends into abutting relation, welding said ends together to form a tube, rolling under pressure the wall of said tube for the entire length of the tube to reduce the tube in thickness to a cross-section tapered from side-to-side and simultaneously elongate the thinner side region of the tube whereby to produce a conical shape in the tube, and subsequently working the material of the smaller end of the cone thus produced toward the center, so as to develop the central substantially co-planar hat portion.

2. The steps in the method of forming, suitable for use in the construction of vehicle wheels and the like, a disk having a conical wall portion and a central substantially co-planar hat portion for attachment to a hub or the like, comprising: curling a strip of flat, uniform thickness stock to bring its ends into abutting relation, welding said ends together to form a tube, rolling under pressure the wall of said tube circumferentially of the tube for the entire length of the tube to reduce the tube in thickness to a cross-section tapered from side-to-side and simultaneously elongate the thinner side region of the tube whereby to produce a conical shape in the tube, and subsequently working the material of the smaller end of the cone thus produced toward the center, so as to develop the central substantially co-planar hat portion.

3. The steps in the method of forming, suitable for use in the construction of vehicle wheels and the like, a disk having a conical wall portion and a central substantially co-planar hat portion for attachment to a hub or the like, comprising: curling a rectangular strip of flat, uniform thickness stock to bring its ends into abutting relation, welding said ends together to form a cylinder, rolling under pressure the wall of said cylinder circumferentially of the cylinder for the entire length of the cylinder to reduce the cylinder in thickness to a cross-section tapered from side-to-side and simultaneously elongate the thinner side region of the cylinder whereby to produce a conical shape in the tube, and subsequently forming inwardly the smaller end of the cone to develop the substantially co-planar hat portion.

4. The steps in the method of forming, suitable for use in the construction of vehicle wheels and the like, a disk having a conical wall portion and a central substantially co-planar hat portion for attachment to a hub or the like, comprising: providing a cylinder of appropriate length and diameter, rolling under pressure the wall of said cylinder for the entire length of the cylinder to reduce the cylinder in thickness to a cross-section tapered from side to side and simultaneously elongate its thinner side region whereby to form a cone, and subsequently forming inwardly the smaller end of the cone to develop the substantially co-planar hat portion.

5. The steps in the method of forming, suitable for use in the construction of vehicle wheels and the like, a disk having a conical wall portion and a central substantially co-planar hat portion for attachment to a hub or the like comprising: curling a strip of flat uniform thickness metal stock to bring its ends into abutting relation, welding said ends together to form a cylinder, spinning the wall of said cylinder along its entire length against a mandrel by moving a spinning wheel forcibly applied to the cylinder wall from one end of the cylinder to the other along an axis that converges with relation to the effective surface of the mandrel, so as to simultaneously taper said wall in thickness from one end of the cylinder to the other and enlarge the thinner end circumferentially to form a cone, and subsequently working the material of the smaller end of the cone thus produced toward the center, so as to develop the substantially co-planar hat portion.

6. The steps in the method of forming, suitable for use in the construction of vehicle wheels and the like, a disk having a conical wall portion and a central substantially co-planar hat portion for attachment to a hub or the like, comprising: curling a strip of flat metal stock to bring its ends into abutting relation, welding said ends together to form a tube, spinning the wall of said tube against a mandrel by moving a spinning wheel forcibly applied to the tube wall from one end of the tube to the other so as to simultaneously taper said wall in thickness from one end of the tube to the other and enlarge the thinner end of the tube circumferentially to form a cone, and subsequently working the material of the smaller end of the cone thus produced toward the center, so as to develop the substantially co-planar hat portion.

7. The steps in the method of forming, suitable for use in the construction of vehicle wheels and the like, a disk having a conical wall portion and a central substantially co-planar hat portion for attachment to a hub or the like, comprising: curling a strip of flat metal stock to bring its ends into abutting relation, welding said ends together to form a tube, forcing said tube on a tapered mandrel larger in diameter at its larger end than the internal diameter of the tube and into a tapered gap between the mandrel and a roller adjacent the mandrel and rolling the wall of the tube between the mandrel and roller, so as to simultaneously taper said wall in thickness from one end to the other and enlarge the thinner end circumferentially to form a cone, and subsequently working the material of the smaller end of the cone thus produced toward the center, so as to develop the substantially co-planar hat region.

8. The steps in the method of forming, suitable for use in the construction of vehicle wheels and the like, a disk having a conical wall portion and a central substantially co-planar hat portion for attachment to a hub or the like, comprising: providing a cylinder of appropriate length and diameter, rolling under pressure the wall of said cylinder for the entire length of the cylinder in a tapered gap between a pair of rolls one of which has a radially extending flange at the larger end of the gap adapted to constrain the cylinder against creeping toward the large end of the gap, to reduce the cylinder in thickness to a cross section tapered from side to side and simultaneously elongate its thinner side region whereby to form a cone, said flange contacting the other roll when the rolling operation is complete for preventing movement of the rolls toward each other, and subsequently forming inwardly the smaller end of the cone to develop the substantially co-planar hat portion.

ROY C. INGERSOLL.